(12) United States Patent
Umeda

(10) Patent No.: US 8,670,793 B2
(45) Date of Patent: Mar. 11, 2014

(54) RADIO COMMUNICATION APPARATUS AND METHOD, CONTROLLING APPARATUS, MOBILE COMMUNICATION SYSTEM

(75) Inventor: Masataka Umeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 270 days.

(21) Appl. No.: 12/651,016

(22) Filed: Dec. 31, 2009

(65) Prior Publication Data

US 2010/0173663 A1 Jul. 8, 2010

(30) Foreign Application Priority Data

Jan. 8, 2009 (JP) .................................. 2009-2667

(51) Int. Cl.
*H04B 7/00* (2006.01)
(52) U.S. Cl.
USPC ............ 455/522; 455/67.11; 455/68; 455/69
(58) Field of Classification Search
USPC ............... 455/522, 67.11, 68–70, 115.3, 126, 455/127.1, 177.1, 200.1, 266, 23, 42, 113; 370/318
See application file for complete search history.

(56) References Cited

U.S. PATENT DOCUMENTS

| | | | | | |
|---|---|---|---|---|---|
| 5,987,013 | A * | 11/1999 | Kabasawa | ...................... | 370/331 |
| 6,075,974 | A * | 6/2000 | Saints et al. | ..................... | 455/69 |
| 6,081,714 | A * | 6/2000 | Wakizaka | ..................... | 455/437 |
| 6,374,119 | B1 * | 4/2002 | Jun et al. | ....................... | 455/523 |
| 6,839,333 | B1 * | 1/2005 | Åkerberg | ...................... | 370/330 |
| 7,248,874 | B2 * | 7/2007 | Persson et al. | ................ | 455/437 |
| 7,420,946 | B2 * | 9/2008 | Kim et al. | ...................... | 370/335 |
| 7,512,411 | B2 * | 3/2009 | Moon et al. | .................... | 455/522 |
| 7,720,479 | B2 * | 5/2010 | Laroia et al. | ................... | 455/436 |
| 7,865,192 | B2 * | 1/2011 | Fukumoto et al. | ......... | 455/452.2 |
| 7,949,005 | B2 * | 5/2011 | Li et al. | .......................... | 370/437 |
| 8,081,709 | B2 * | 12/2011 | Hara et al. | ..................... | 375/295 |
| 2001/0004597 | A1 * | 6/2001 | Hirahara | ....................... | 455/442 |
| 2001/0014608 | A1 * | 8/2001 | Backstrom et al. | ........... | 455/450 |
| 2003/0125039 | A1 * | 7/2003 | Lachtar et al. | ................ | 455/453 |
| 2005/0148336 | A1 * | 7/2005 | Nagato et al. | ................. | 455/450 |
| 2005/0238053 | A1 * | 10/2005 | Iochi et al. | ..................... | 370/473 |
| 2006/0023649 | A1 * | 2/2006 | Tillet et al. | ..................... | 370/310 |

(Continued)

FOREIGN PATENT DOCUMENTS

JP 2007532057 A 11/2007
JP 2008061250 3/2008

(Continued)

OTHER PUBLICATIONS

3GPP TSG RAN WG1 Meeting #43 Seoul, Korea, Nov. 7-11, 2005 R1-051341.

(Continued)

*Primary Examiner* — Dominic E Rego

(74) *Attorney, Agent, or Firm* — Smith, Gambrell & Russell, LLP

(57) ABSTRACT

A radio communication apparatus, for use as a base station, includes a receiver configured to receive a signal in a predetermined radio frequency band transmitted from a terminal under control of another radio communication apparatus adjacent to the radio communication apparatus and detecting a receiving condition of the signal and a notifying unit configured to notify the receiving condition to an apparatus performing transmission power control of the signal in the predetermined radio frequency band transmitted from the terminal.

22 Claims, 13 Drawing Sheets

(56) References Cited

U.S. PATENT DOCUMENTS

| | | | |
|---|---|---|---|
| 2006/0135070 A1* | 6/2006 | Karabinis | 455/63.1 |
| 2006/0178163 A1* | 8/2006 | Richards et al. | 455/522 |
| 2006/0234715 A1 | 10/2006 | Cho et al. | |
| 2006/0270406 A1* | 11/2006 | Kim | 455/436 |
| 2007/0258411 A1* | 11/2007 | Trigui | 370/335 |
| 2008/0057934 A1* | 3/2008 | Sung et al. | 455/422.1 |
| 2008/0102822 A1 | 5/2008 | Feng et al. | |
| 2008/0168322 A1 | 7/2008 | Okamoto et al. | |
| 2008/0214195 A1* | 9/2008 | Sipila et al. | 455/436 |
| 2009/0047969 A1* | 2/2009 | Lee et al. | 455/446 |
| 2009/0067383 A1* | 3/2009 | Fleming et al. | 370/330 |
| 2009/0082002 A1* | 3/2009 | Kim et al. | 455/418 |
| 2009/0163210 A1* | 6/2009 | Abedi et al. | 455/436 |
| 2009/0221238 A1* | 9/2009 | Ko et al. | 455/67.13 |
| 2009/0291692 A1* | 11/2009 | Kazmi et al. | 455/452.2 |
| 2009/0325627 A1* | 12/2009 | Lee | 455/522 |
| 2010/0008317 A1* | 1/2010 | Bhattad et al. | 370/329 |
| 2010/0029319 A1* | 2/2010 | Higuchi et al. | 455/522 |
| 2010/0035562 A1* | 2/2010 | Alberth et al. | 455/75 |
| 2010/0087221 A1* | 4/2010 | Srinivasan et al. | 455/522 |
| 2010/0157934 A1 | 6/2010 | Tanno et al. | |
| 2010/0234058 A1* | 9/2010 | Hu et al. | 455/522 |
| 2010/0273502 A1* | 10/2010 | Uemura et al. | 455/452.2 |
| 2011/0207468 A1* | 8/2011 | Nakamura et al. | 455/450 |

FOREIGN PATENT DOCUMENTS

| | | |
|---|---|---|
| JP | 2008118656 | 5/2008 |
| JP | 2008167354 A | 7/2008 |
| JP | 2008193520 | 8/2008 |
| JP | 2008283491 A | 11/2008 |

OTHER PUBLICATIONS

Notification of Reason for Refusal Office Action dated Dec. 25, 2012 in corresponding Japanese Patent Application No. 2009-002667.

* cited by examiner

FIG. 9

| MODULATION SCHEME CODING RATE | CINR (dB) |
|---|---|
| QPSK (1/2) | 3 |
| QPSK (3/4) | 6 |
| 16QAM (1/2) | 8 |
| 16QAM (3/4) | 11 |
| 64QAM (1/2) | 16 |
| 64QAM (3/4) | 19 |

FIG. 10

| ID OF MOBILE STATION | CINR1 | CINR2 | TRANSMISSION POWER | CORRECTION VALUE | PREDICTED VALUE OF CINR1 | PREDICTED VALUE OF CINR2 | MODULATION SCHEME CODING RATE | INTERVAL | 51 |
|---|---|---|---|---|---|---|---|---|---|
| #1 | 3dB | 17dB | −40dBm | — | — | — | 64QAM (1/2) | SECOND DISTANCE | ⋯ |
| #2 | 5dB | 18dB | −38dBm | — | — | — | QPSK (1/2) | FIRST DISTANCE | ⋯ |
| ⋯ | ⋯ | ⋯ | ⋯ | ⋯ | ⋯ | ⋯ | ⋯ | ⋯ | ⋯ |

FIG. 11

| ID OF MOBILE STATION | CINR1 | CINR2 | TRANSMISSION POWER | CORRECTION VALUE | PREDICTED VALUE OF CINR1 | PREDICTED VALUE OF CINR2 | MODULATION SCHEME CODING RATE | INTERVAL |
|---|---|---|---|---|---|---|---|---|
| #1 | 3dB | 17dB | −40dBm | +3dB | (3+3) dB | (17+3) dB | 64QAM (3/4) | SECOND DISTANCE |
| #2 | 5dB | 18dB | −38dBm | −3dB | (5−3) dB | (18−3) dB | 16QAM (3/4) | SECOND DISTANCE |
| ... | ... | ... | ... | ... | ... | ... | ... | ... |

51

RADIO COMMUNICATION APPARATUS AND METHOD, CONTROLLING APPARATUS, MOBILE COMMUNICATION SYSTEM

CROSS-REFERENCE TO RELATED APPLICATIONS

This application is based upon and claims the benefit of priority of prior Japanese Patent Application No 2009-2667, filed on Jan. 8, 2009, the entire contents of which are incorporated herein by reference.

FIELD

Certain aspects of the embodiments discussed herein are related to a radio communication apparatus, controlling apparatus, mobile communication system and radio communication method. The embodiments are applicable to a radio communication apparatus, controlling apparatus, mobile communication system and radio communication method in which OFDM (Orthogonal Frequency Division Multiplexing) is used as a transmission scheme. The embodiments are also applicable to a radio communication apparatus, controlling apparatus, mobile communication system and radio communication method with an FFR (Fractional Frequency Reuse) scheme in which frequencies are reused.

BACKGROUND

A method of controlling inter-cell interference in a mobile communication system has conventionally been known. The method includes the step of receiving an uplink signal through a radio antenna of a mobile communication base station and extracting inter-cell interference amount information from the received uplink signal, the step of producing uplink control information based on the inter-cell interference amount information, and the step of transmitting the produced uplink control information to a mobile communication terminal placed in an adjacent cell. The terminal is characterized by scheduling uplink resources with reference to the uplink control information (for example, Japanese laid open patent publication 2008-61250).

A method of scheduling uplink resources in a cellular communication system has also been known. The method includes the step of finding a base station in at least one adjacent cell having the highest inter-cell interference with adjacent cells for each mobile station and calculating the inter-cell interference value in an uplink direction, the step of grouping all mobile stations within the cell based on the inter-cell interference value, the step of grouping subcarriers in accordance with the grouping of the mobile stations and associating the mobile stations for each group with the carriers of one group, the step of assigning the subcarriers for each group to the mobile stations included in the specific mobile station group associated with the subcarriers of the group, and the step of calculating an available signal-to-noise interference power ratio in the sub carrier for each mobile station and performing a multi mobile station resource scheduling algorithm (for example, Japanese laid open patent publication 2008-118656).

The conventional method of controlling inter-cell interference, however, does not provide a structure for determining the interference amount of a particular mobile communication terminal (mobile station), so that the interference amount of a particular mobile station cannot be determined. In addition, since the contents of scheduling of each mobile station are not known, the scheduling of each mobile station cannot be performed. On the other hand, in the conventional method of scheduling uplink resources, the inter-cell interference value in the uplink direction with the base station in the adjacent cell is calculated on the basis of the intensity of the pilot signal in the adjacent cell, so that the interference amount in the uplink direction with the adjacent cell cannot be determined accurately. This presents the problem in which the scheduling of the uplink resources cannot be performed accurately.

SUMMARY

According to a certain aspect of the embodiments, in a radio communication apparatus, controlling apparatus, mobile communication system and radio communication method, a first radio frequency band for uplink signals to a first base station is assigned to a mobile station selected as a target for measurement and residing in a cell in which the mobile station can communicate with the first base station. When a second base station, which transmits and receives a signal in a second radio frequency band different from the first radio frequency band, receives a signal in the first radio frequency band, the second base station notifies the receiving condition thereof to the controlling apparatus. The controlling apparatus notifies the first base station of information for controlling an uplink of the mobile station based on the notification by the second base station. The first base station controls the transmission power of the mobile station selected as the target for measurement based on the notification by the controlling apparatus. The first base station predicts the receiving condition of an uplink signal after control of the transmission power of the mobile station selected as the target for measurement and, based on the prediction, decides the modulation scheme and the coding rate of the uplink signal of the mobile station selected as the target for measurement or the interval when the same radio frequency band is reused. The controlling apparatus can decide the modulation scheme and the coding rate of the uplink signal of the mobile station selected as the target for measurement or the interval when the same radio frequency band is reused, instead of the first base station, and can notify the first base station of the information.

It is to be understood that both the foregoing general description and the following detailed description are exemplary and explanatory and are not restrictive of the embodiments, as claimed.

BRIEF DESCRIPTION OF DRAWINGS

FIG. 9 illustrates an example of a MCS table.

FIG. 10 illustrates an example of a profile list before revising.

FIG. 11 illustrates an example of a profile list after revising.

DESCRIPTION OF EMBODIMENTS

Embodiments are described with reference to the figures.

Embodiment 1

Structure of Mobile Communication System

Figure 1:
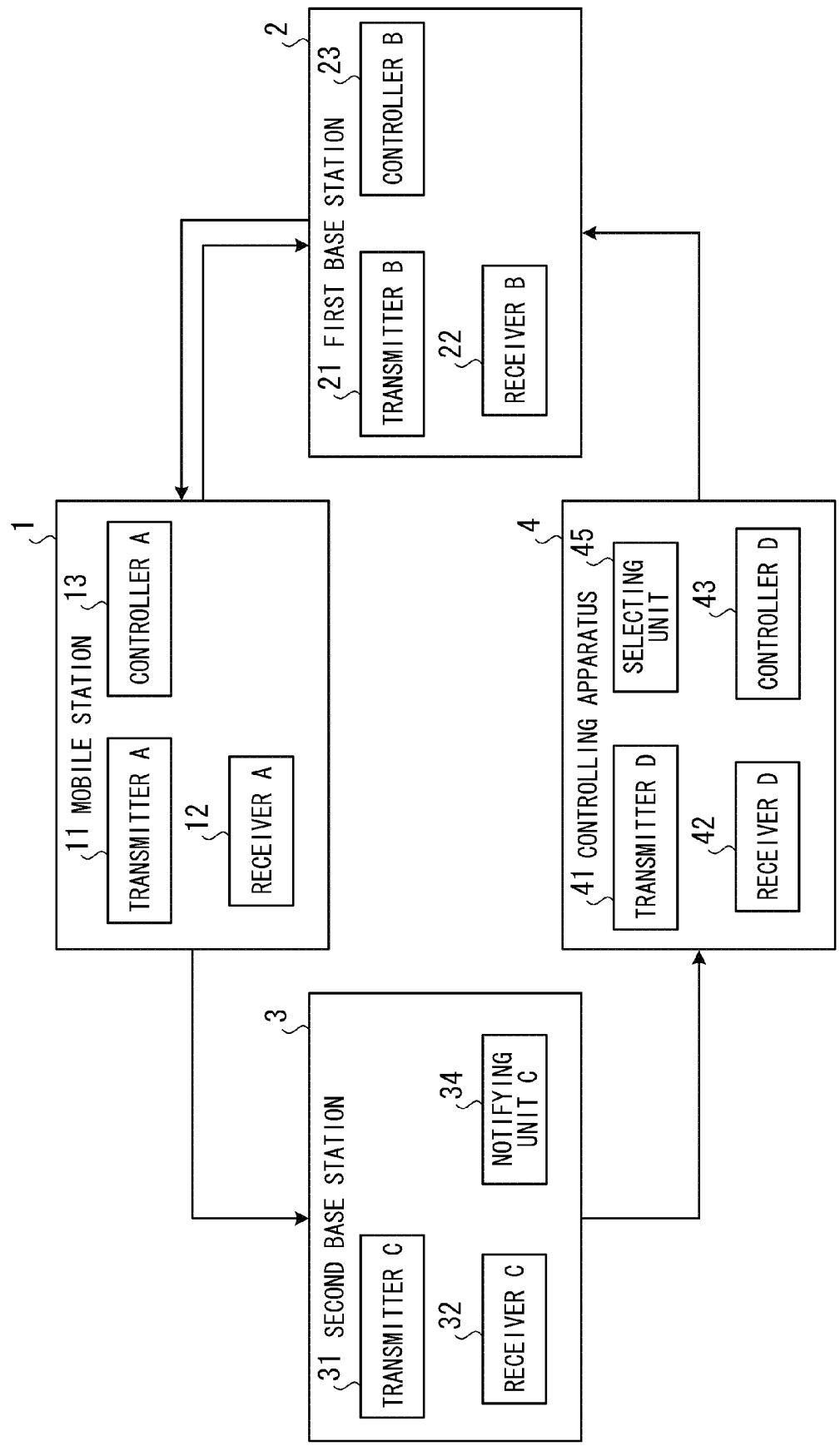
FIG. 1 illustrates an example of a mobile communication system.

FIG. 1 is an explanatory diagram illustrating a mobile communication system of Embodiment 1. As illustrated in FIG. 1, the mobile communication system includes a mobile station (terminal) 1, a first base station 2, a second base station 3, and a controlling apparatus 4. The mobile station 1 resides in a cell of the first base station 2 and wirelessly communicates with the first base station 2. The mobile station 1 is assigned a first radio frequency band by the first base station 2 as a radio frequency band for uplink signals to the first base station 2. The first radio frequency band is not assigned to another mobile station (not illustrated) which is wirelessly connected to the first base station 2 or the second base station 3. The second base station 3 is a base station placed on the periphery of the first base station 2. In general, a plurality of second base stations 3 are placed to surround the first base station 2. The second base station 3 uses a second radio frequency band different from the first radio frequency band to perform radio communication with the mobile station 1. The controlling apparatus 4 controls the first base station 2 and the second base station 3. A gateway server is used as the controlling apparatus 4, for example. In the mobile station 1, each of the base stations 2, 3, and the controlling apparatus 4, constituent components having the same name are identified by adding alphabets (A, B, C, or D) to the ends of their names.

Structure of Mobile Station

The mobile station 1 includes a transmitter A11, a receiver A12, and a controller A13. The transmitter A11 transmits an uplink signal in the first radio frequency band to the first base station 2. The receiver A12 receives a downlink signal from the first base station 2. The downlink signal can contain information about the receiving condition when the second base station 3 receives the signal in the first radio frequency band. The information about the receiving condition includes, for example, information for controlling the transmission power, the modulation scheme, or the coding rate of the uplink signal to the first base station 2. The controller A13 controls the transmission power, the modulation scheme, or the coding rate of the uplink signal, for example, based on the information for controlling the uplink signal.

Structure of First Base Station

The first base station 2 includes a transmitter B21, a receiver B22, and a controller B23. The transmitter B21 transmits the downlink signal to the mobile station 1. The receiver B22 receives the uplink signal in the first radio frequency band as an intended wave from the mobile station 1. The receiver B22 receives information notified by the controlling apparatus 4. The controller B23 controls an uplink of the mobile station 1 based on the information notified by the controlling apparatus 4. Examples of the contents of the uplink control include controlling the transmission power of the mobile station 1 based on the information notified by the controlling apparatus 4. For controlling the transmission power of the mobile station 1, a correction value of the transmission power of the mobile station 1 is notified by the controlling apparatus 4.

Examples of the contents of the uplink control also include predicting the receiving condition in receiving the uplink signal with the controlled transmission power from the mobile station 1 and, based on the prediction, determining the modulation scheme and the coding rate of the uplink signal of the mobile station 1 and the interval when the same radio frequency band is reused. The prediction of the receiving conditions includes calculating a predicted value of CINR (Carrier to Interference and Noise Ratio). The controller B23 can control a downlink to the mobile station 1 based on the information notified by the controlling apparatus 4. Examples of the contents of the downlink control include controlling the transmission power of the downlink signal transmitted to the mobile station 1.

Structure of Second Base Station

The second base station 3 includes a transmitter C31, a receiver C32, and a notifying unit C34. The receiver C32 receives a signal in the first radio frequency band as an interference wave from the mobile station 1. The receive C32 detects the receiving condition of the signal in the first radio frequency band. The notifying unit C34 notifies the controlling apparatus 4 of the information about the receiving condition of the signal in the first radio frequency band through the transmitter C31. Examples of the information about the receiving condition include the reception power.

Structure of Controlling Apparatus

The controlling apparatus 4 includes a transmitter D41, a receiver D42, a controller D43, and a selecting unit D45. The receiver D42 receives, from the second base station 3, information about the receiving condition when the second base station 3 receives the signal in the first radio frequency band. The controller D43 controls the uplink of the mobile station 1 based on the information about the receiving condition from the second base station 3. Examples of the contents of the uplink control include determining a correction value of the transmission power of the mobile station 1 and transmitting the correction value to the first base station 2 through the transmitter D41 by the controller D43. Examples of the contents of the transmission power correction include reducing the transmission power of the mobile station 1 when the reception power of the signal in the first radio frequency band is high in the second base station 3. Examples of the contents of the transmission power control also include increasing the transmission power of the mobile station 1 when the reception power of the signal in the first radio frequency band is low in the second base station 3.

The controller D43 can predict the receiving condition when the first base station 2 receives the uplink signal with the controlled transmission power from the mobile station 1, and based on the prediction, can determine the modulation scheme and the coding rate of the uplink signal of the mobile station 1 and the interval when the same radio frequency band is reused, instead of the controller B23 of the first base station 2. In this case, the controller D43 transmits the determination contents to the first base station 2 through the transmitter D41. The first base station 2 controls the uplink of the mobile station 1 in accordance with the determination contents. The selecting unit D45 preselects the mobile station 1 to which the first radio frequency band is assigned as the frequency band of the uplink signal, and notifies the first base station 2 and the second base station 3 through the controller D41 that the mobile station 1 is selected. A third base station other than the first base station 2 and the second base station 3 can double as the controlling apparatus.

Processing Procedure

Figure 2:
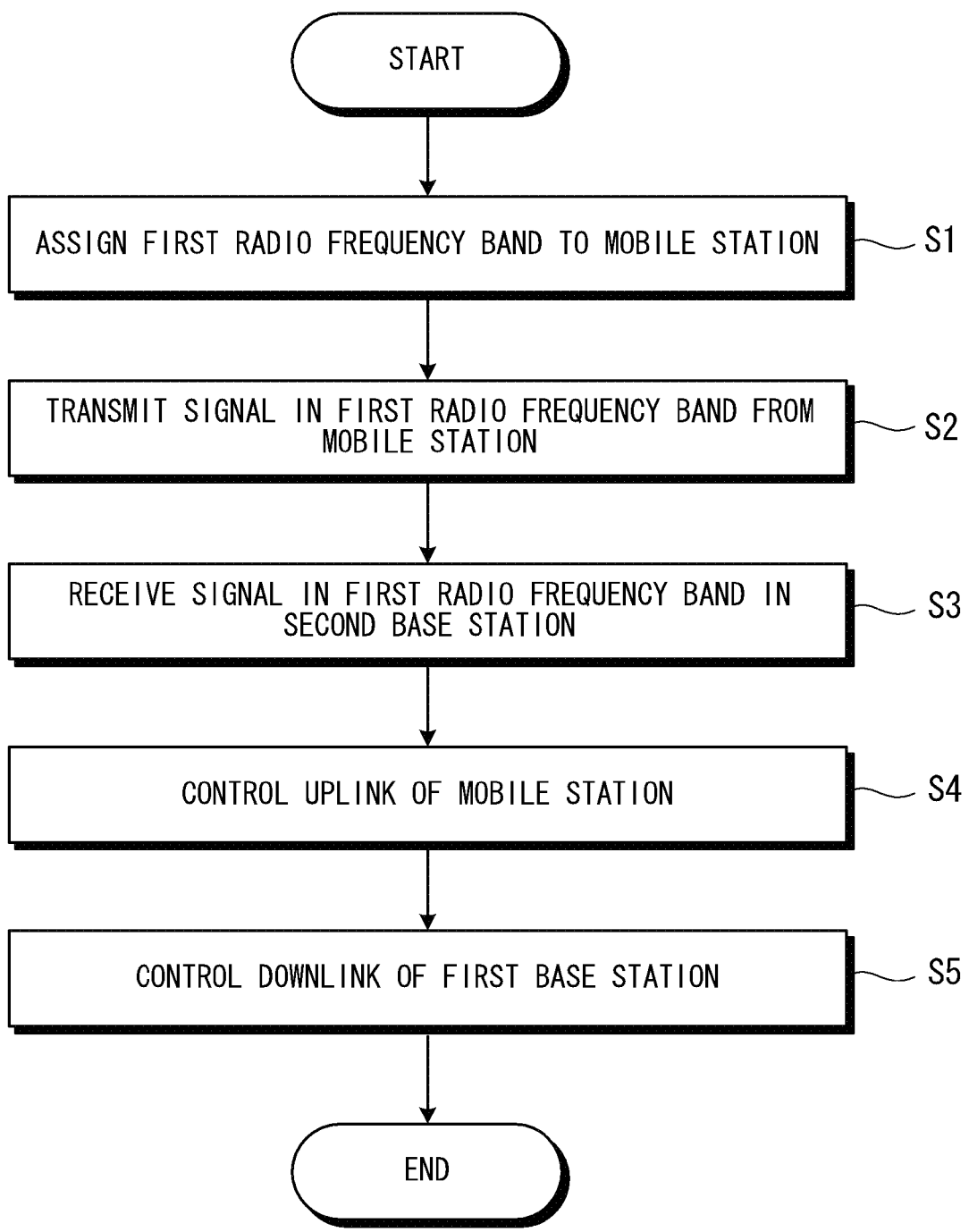
FIG. 2 illustrates an example of a radio communication method.

FIG. 2 is an explanatory diagram illustrating a radio communication method of Embodiment 1. As illustrated in FIG. 2, when the radio communication method of Embodiment 1 is started, the first base station 2 first assigns the first radio frequency band to the mobile station 1 as the radio frequency band for uplink signals (step S1). The first base station 2 also assigns a band other than the first radio frequency band as a frequency band for radio communication with another mobile station belonging to the cell of the first base station 2. On the other hand, the second base station 3 assigns a band other than the first radio frequency band as a frequency band for radio communication with a mobile station belonging to the cell of the second base station 3. In other words, the first radio frequency band is assigned only to the mobile station 1 to be measured in a range in which radio waves can reach from the mobile station.

The mobile station 1 transmits an uplink signal by using the assigned first radio frequency band (step S2). The second base station 3 can receive the signal in the first radio frequency band as an interference wave (step S3). The second base station 3 detects the receiving condition of the signal in the first radio frequency band and notifies the controlling apparatus 4 about the receiving condition. The controlling apparatus 4 produces information for controlling the uplink of the mobile station 1 based on the receiving condition notified by the second base station 3 and transmits the information to the first base station 2. The first base station 2 receives the information produced by the controlling apparatus 4 and controls the uplink of the mobile station 1 based on the information (step S4). The first base station 2 also controls the downlink to the mobile station 1 based on the information provided by the controlling apparatus 4 (step S5) and then a series of processing is completed. The control of the downlink can not be performed.

In Embodiment 1, the first radio frequency band can be previously fixed or can be set by the controlling apparatus 4 or the first base station 2 each time the processing is performed. The information about the receiving condition of the signal in the first radio frequency band can be provided by using information acquired by all of the second base stations 3 present around the first base station 2 or by using only the information acquired from a second base station 3 in a different cell which uses the same frequency band as that of the cell to which the mobile station 1 belongs. As the mobile station 1 to which the first radio frequency band is assigned, it is possible to select an arbitrary mobile station or select a mobile station placed at the end of the cell or a mobile station located at the end of a sector.

It can be assumed that the mobile station should be located at the end of the cell or the end of the sector based on the transmission power of the uplink signal of the mobile station or the CINR value of the uplink signal from the mobile station in the base station. The position of the mobile station can be assumed by using the position information of the GPS (Global Positioning System) provided by the mobile station. It can be assumed that the mobile station can be located at the end of the cell based on the reception power when the mobile station receives a pilot signal from the base station on the periphery. The position of the mobile station can be assumed by using an array antenna of the base station to estimate the angle. The first base station 2 can select the mobile station 1 to which the first radio frequency band is assigned and requests the controlling apparatus 4 to measure the effects of the interference wave in the first radio frequency band. Alternatively, the controlling apparatus 4 can acquire the various types of information described above for assuming the position of the mobile station from each base station and select the appropriate mobile station 1 based on the information.

As the mobile station, the base station and the controlling apparatus, it is possible to use a mobile station, a base station and a controlling apparatus of the FFR scheme in which the OFDM is used as the transmission scheme, for example. The mobile station, the base station and the controlling apparatus which employ the FFR scheme in the OFDM scheme will hereinafter be described as Embodiment 2.

Embodiment 2

Structure of Base Station

Figure 3:
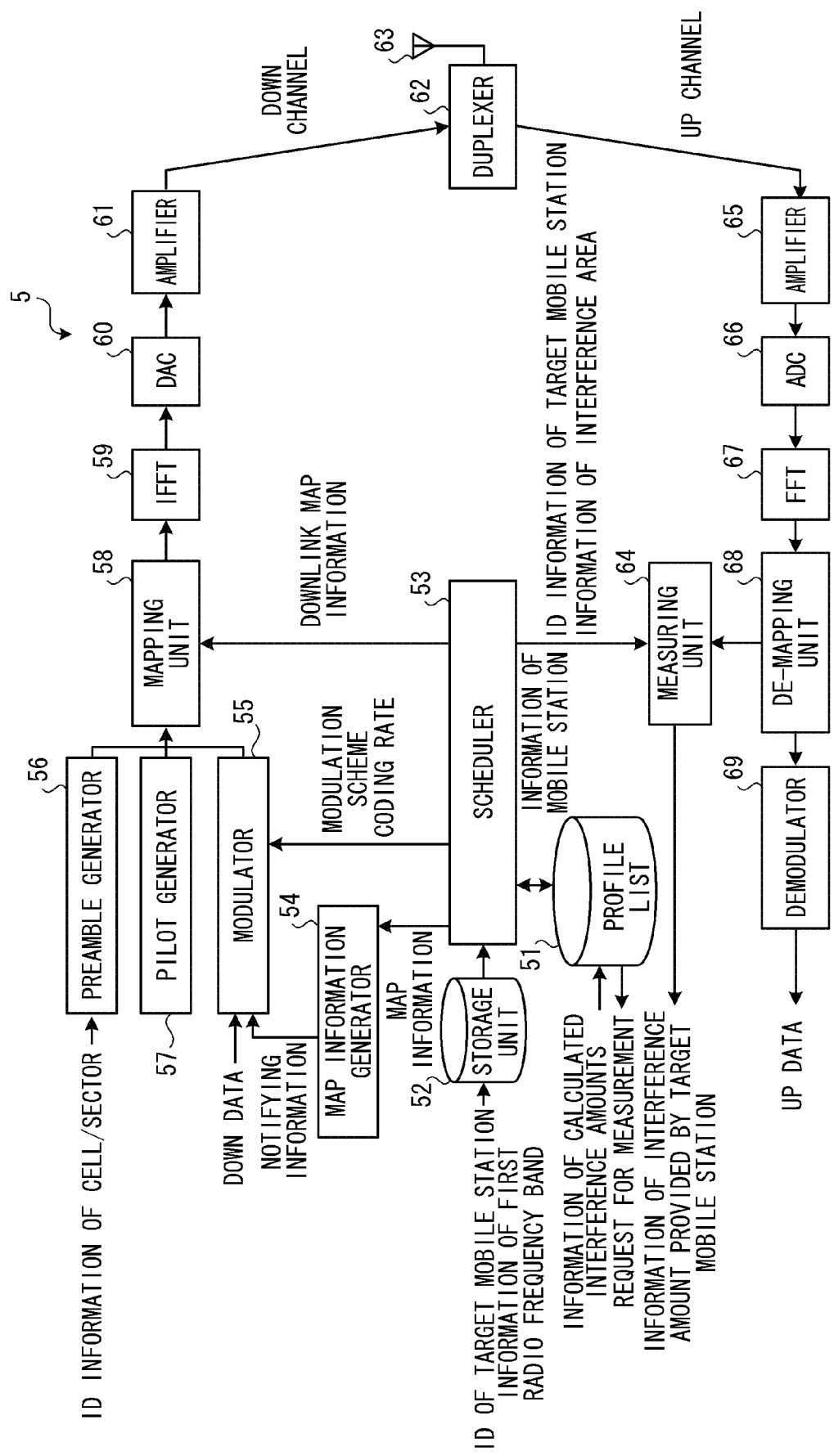
FIG. 3 illustrates an example of a base station.

FIG. 3 is an explanatory diagram illustrating a base station of Embodiment 2. As illustrated in FIG. 3, a base station 5 includes a profile list 51, a storage unit 52, a scheduler 53, a MAP information generator 54, and a modulator 55. The profile list 51 contains stored information of each mobile station which belongs to a local cell. Examples of the information of the mobile station include, but are not limited to, information about transmission power or reception quality. Examples of the information about reception quality include, but are not limited to, a CINR value.

The base station 5 refers to the information about the transmission power and the reception quality of each mobile station stored in the profile list 51 and checks whether there is a mobile station which has a transmission power higher than a predetermined threshold value and has poor reception quality. When such a mobile station is present, the base station 5 selects the mobile station as a potential target for measurement and transmits a request for measurement to a controlling apparatus. The request for measurement includes, but is not limited to, information of the ID (identification information) of the mobile station selected as the potential target for measurement, information of the interval of reuse of a radio frequency band, and information of the ID of a cell or a sector to which the mobile station selected as the potential target for measurement belongs. The profile list 51 contains stored information notified by the controlling apparatus. Examples of the information provided by the controlling apparatus include, but are not limited to, information provided by calculating interference amounts given to surrounding base stations by the mobile station selected as the target for measurement. Examples of the information provided by calculating interference amounts include a correction value of the transmission power of the mobile station selected as the target for measurement.

The storage unit 52 stores the information notified by the controlling apparatus. Examples of the information provided by the controlling apparatus include, but are not limited to, information of the ID of the mobile station selected as the target for measurement and information of a first radio frequency band. The scheduler 53 determines the map information, the modulation scheme and the coding rate of each mobile station such that the first radio frequency band is assigned to the band of a uplink signal of the mobile station selected as the target for measurement stored in the storage unit 52. The scheduler 53 determines the modulation scheme and the coding rate of the mobile station selected as the target for measurement and the interval when the same radio frequency band is reused, on the basis of the information provided by calculating the interference amounts of the mobile station selected as the target for measurement stored in the profile list 51. The scheduler 53 also updates the profile list 51.

The MAP information generator 54 generates notifying information including, but not limited to, band assignment information for each mobile station based on the map information, the modulation scheme and the coding rate determined by the scheduler 53. The modulator 55 performs modulation processing on the notifying information generated by the MAP information generator 54, the down data information, the information of the preamble generated by the preamble generator 56 and the pilot symbol generated by the pilot generator 57. The information of the preamble includes, but is not limited to, information of the ID of the cell or the sector. The signal modulated by the modulator 55 passes through a mapping unit 58, an IFFT (inverse Fourier transformer) 59, a DAC (digital to analog converter) 60, an amplifier 61 and a duplexer 62 and is transmitted via an antenna 63.

The base station 5 includes a measuring unit 64. The measuring unit 64 receives, from the scheduler 53, information of the ID of the mobile station selected as the target for measurement and the information of an interference area. Examples of the information of the interference area include information of the first radio frequency band. When the base station 5 is ready to wirelessly communicate with a mobile station residing in the local cell by using the second radio frequency band, that is, when the base station 5 corresponds to the second base station 3 in Embodiment 1, the measuring unit 64 measures the receiving condition of a signal in the first radio frequency band received as an interference wave by the antenna 63 and sent through the duplexer 62, the amplifier 65, the ADC (analog to digital converter) 66, the FFT (Fourier transformer) 67 and a de-mapping unit 68. The measuring unit 64 notifies the controlling apparatus of the measuring result as the information of the interference amount provided by the mobile station selected as the target for measurement. At this point, the measuring unit 64 can notify the controlling apparatus when the measuring result is equal to or higher than a predetermined threshold value or can notify the controlling apparatus in any case. Examples of the information of the interference amount of the mobile station selected as the target for measurement include, but are not limited to, the reception power.

When the base station 5 corresponds to the second base station 3 in Embodiment 1, a signal in the second radio frequency band received by the antenna 63 is sent from the de-mapping unit 68 to a demodulator 69 and is demodulated into up data by the demodulator 69. When the base station 5 is ready to receive the uplink signal in the first radio frequency band from the mobile station selected as the target for measurement, that is, when the base station 5 corresponds to the first base station 2 in Embodiment 1, the uplink signal in the first radio frequency band is sent from the de-mapping unit 68 to the demodulator 69 and is demodulated into up data by the demodulator 69. A wired communication channel can connect or a wireless communication channel can connect between the base station 5 and the controlling apparatus.

Structure of Controlling Apparatus

Figure 4:
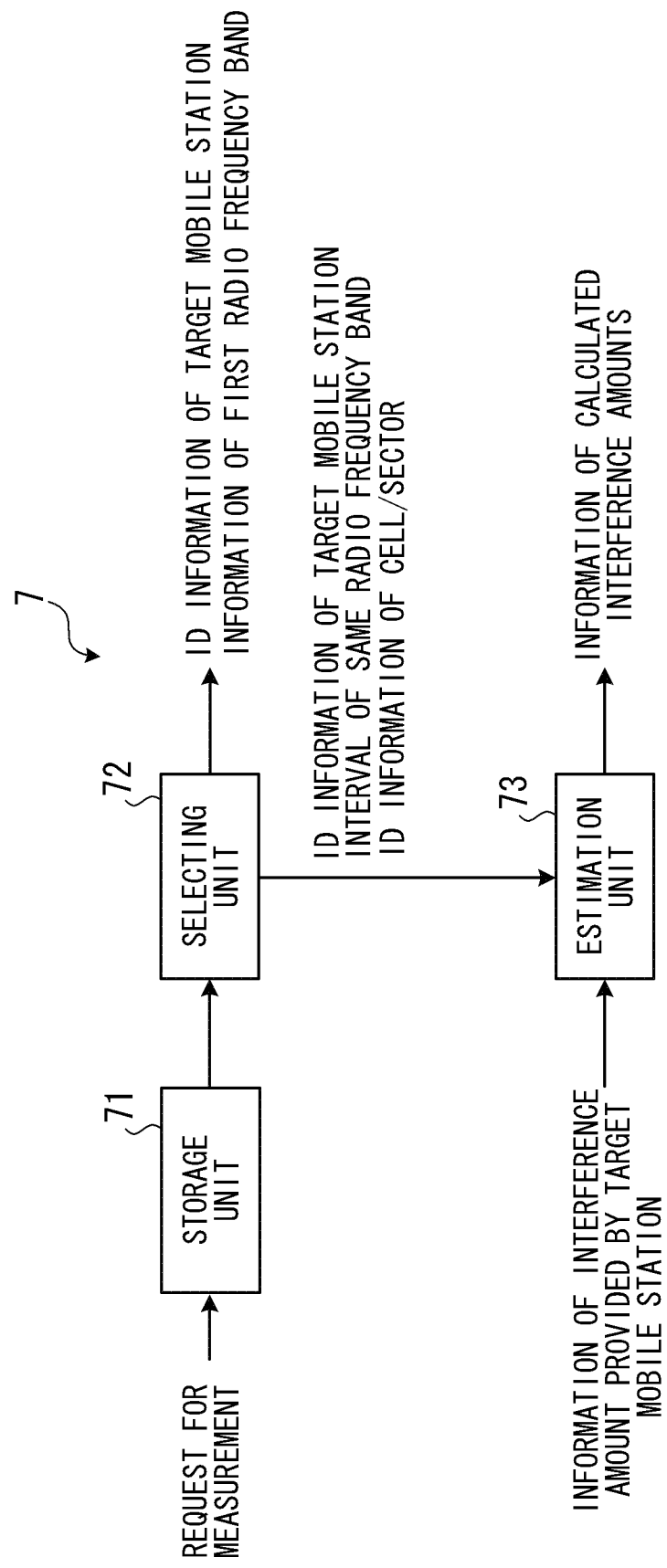
FIG. 4 illustrates an example of a controlling apparatus.

FIG. 4 is an explanatory diagram illustrating the controlling apparatus of Embodiment 2. As illustrated in FIG. 4, a controlling apparatus 7 includes a storage unit 71, a selecting unit 72 and an estimation unit 73. The storage unit stores the information contained in the request for measurement transmitted from each base station 5. Examples of the information transmitted from the base station 5 include, but are not limited to, the information of the ID of the base station which transmitted the request for measurement, the information of the ID of the mobile station selected as the potential target for measurement, the information of the interval of reuse of the radio frequency band and the information of the ID of the cell or the sector to which the mobile station selected as the potential target for measurement belongs. The selecting unit 72 arbitrarily selects a mobile station as the next target for measurement based on the information stored in the storage unit 71 and determines the first radio frequency band based on the information of the interval of reuse of the radio frequency band and the information of the ID of the cell or the sector.

The selecting unit 72 notifies the information of the ID of the mobile station selected as the target for measurement and the information of the first radio frequency band to the base station (base station corresponding to the first base station 2) of the cell to which the mobile station selected as the target for measurement belongs and the base station (base station corresponding to the second base station 3) of the cell on the periphery.

The estimation unit 73 receives, from the selecting unit 72, the information of the ID of the mobile station selected as the target for measurement, the information of the interval of reuse of the radio frequency band and the information of the ID of the cell or the sector. The estimation unit 73 acquires the information of the interference amount provided by the mobile station selected as the target for measurement from the base station of each cell around the cell to which the mobile station selected as the target for measurement belongs and notifies the base station of the cell to which the mobile station selected as the target for measurement belongs of the information provided by calculating the interference amounts. For example, the estimation unit 73 acquires the information of the interference amounts from the surrounding cells or sectors which use the same frequency band as that of the cell or sector to which the mobile station selected as the target for measurement belongs and selects the maximum value from the acquired information of the interference amounts. When the maximum value of the interference amount is larger than a predetermined value, the estimation unit 73 sets a correction value of the transmission power so as to reduce the transmission power of the mobile station selected as the target for measurement. When the maximum value of the interference amount is smaller than the predetermined value, the estimation unit 73 can set a correction value of the transmission power so as to increase the transmission power of the mobile station selected as the target for measurement. The estimation unit 73 notifies the correction value to the base station of the cell to which the mobile station selected as the target for measurement belongs.

Structure of Mobile Station

Figure 5:
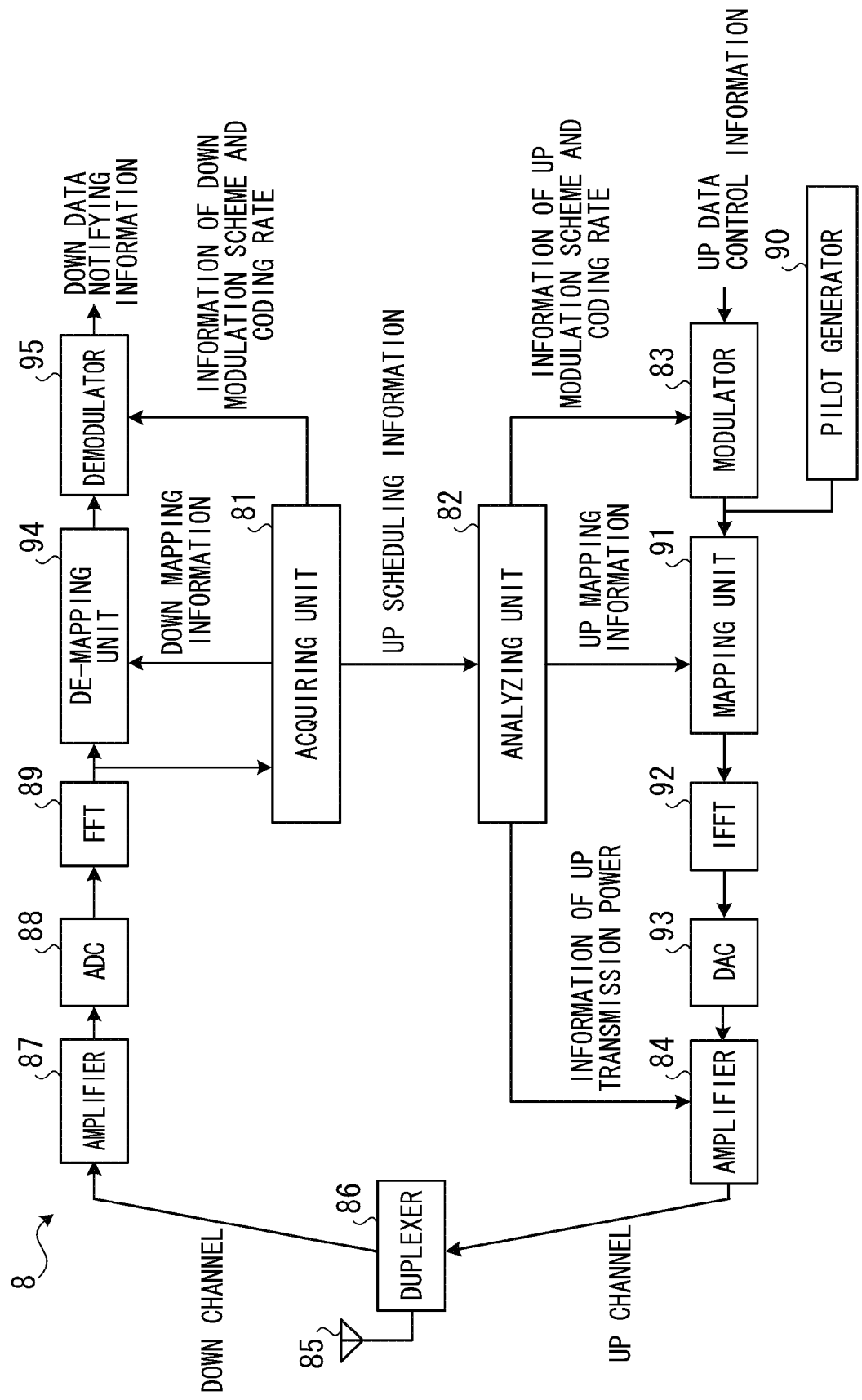
FIG. 5 illustrates an example of a mobile station.

FIG. 5 is an explanatory diagram illustrating the mobile station of Embodiment 2. As illustrated in FIG. 5, the mobile station 8 includes an acquiring unit 81, an analyzing unit 82, a modulator 83 and an amplifier 84 for an uplink channel. The acquiring unit 81 acquires up scheduling information from a downlink signal received by the antenna 85 and sent through a duplexer 86, an amplifier 87, an ADC 88 and an FFT 89. The analyzing unit 82 analyzes the up scheduling information acquired by the acquiring unit 81 to take information of up transmission power, up mapping information and information of an up modulation scheme and coding rate.

The modulator 83 performs modulation processing on up data and control information based on the information of the up modulation scheme and coding rate acquired by the analyzing unit 82. Examples of the control information include information of reception quality of a downlink signal. The amplifier 84 controls the transmission power of the uplink signal based on the information of the up transmission power acquired by the analyzing unit 82. The signal modulated by the modulator 83 and a pilot symbol generated by a pilot generator 90 are mapped by a mapping unit 91 based on up mapping information, passes through an IFFT 92, a DAC 93, the amplifier 84 and the duplexer 86, and is transmitted via the antenna 85. A signal received by the antenna 85 is sent from the FFT 89 to a demodulator 95 through a de-mapping unit 94 and is demodulated into down data and notifying information by the demodulator 95.

Figure 6:
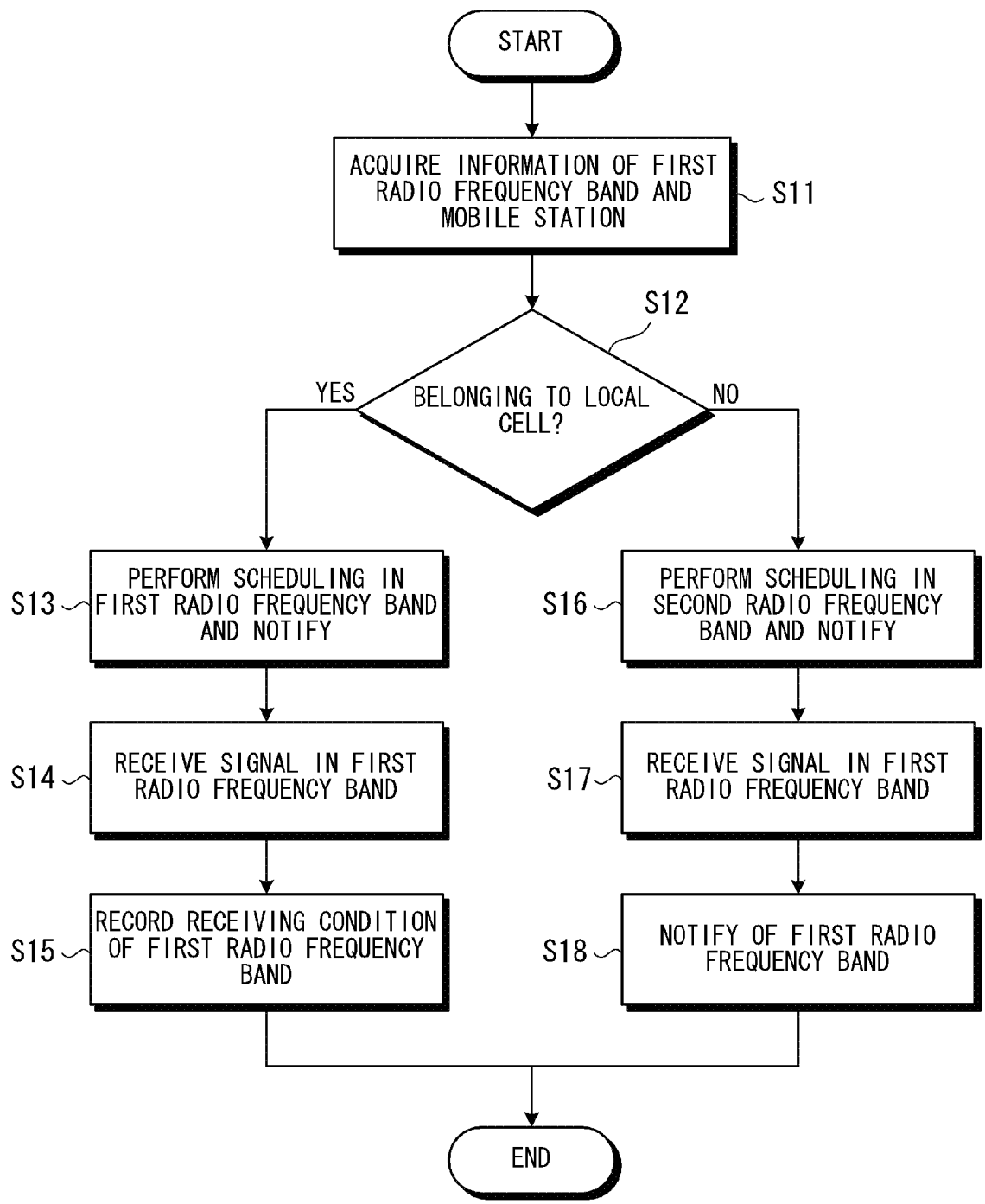
FIG. 6 illustrates a processing procedure when the base station receives a radio signal in a first radio frequency band.

Processing Procedure When Base Station Receives Signal in First Radio Frequency Band FIG. 6 is an explanatory diagram illustrating a processing procedure when the base station of Embodiment 2 receives a signal in the first radio frequency band. As illustrated in FIG. 6, the base station 5 first acquires information of the first radio frequency band and information of the ID of the mobile station 8 selected as the target for measurement from the controlling apparatus 7 (step S11). Next, the base station 5 determines whether or not the mobile station 8 selected as the target for measurement belongs to the local cell (step S12).

When the mobile station selected as the target for measurement belongs to the local cell (step S12: Yes), the base station 5 performs scheduling such that the first radio frequency band is assigned to the uplink signal of the mobile station 8 selected as the target for measurement. Then, the base station 5 notifies the mobile station 8 selected as the target for measurement and other mobile stations belonging to the local cell of the scheduling information (step S13). Thus, the respective mobile stations (including the mobile station 8 selected as the target for measurement) belonging to the cell of the base station 5 receive the scheduling information and assign radio frequency bands based on the scheduling information. The mobile station 8 selected as the target for measurement transmits the uplink signal in the first radio frequency band to the base station. The base station 5 receives the uplink signal in the first radio frequency band (step S14). Then, the base station 5 records the receiving condition of the first radio frequency band. For example, the base station 5 measures the reception power or CINR in the first radio frequency band as the receiving condition of the first radio frequency band and records the measurement value in the profile list 51 (step S15).

On the other hand, when the mobile station 8 selected as the target for measurement does not belong to the local cell (step S12: No), the base station 5 performs scheduling such that the second radio frequency band different from the first radio frequency band is assigned to mobile stations belonging to the local cell. Then, the base station 5 notifies the mobile stations belonging to the local cell of the information of the scheduling (step S16). Thus, the respective mobile stations belonging to the cell of the base station 5 receive the scheduling information and assign radio frequency bands based on the information of the scheduling. Upon reception of the signal in the first radio frequency band (step S17), the base station 5 measures the receiving condition thereof and notifies the controlling apparatus of the receiving condition of the first radio frequency band (step S18). For example, the base station 5 measures the reception power as the receiving condition of the first radio frequency band, and when the measuring result is equal to or higher than a predetermined threshold, the base station 5 notifies the controlling apparatus as the information of the interference amount provided by the mobile station 8 selected as the target for measurement.

Figure 7:
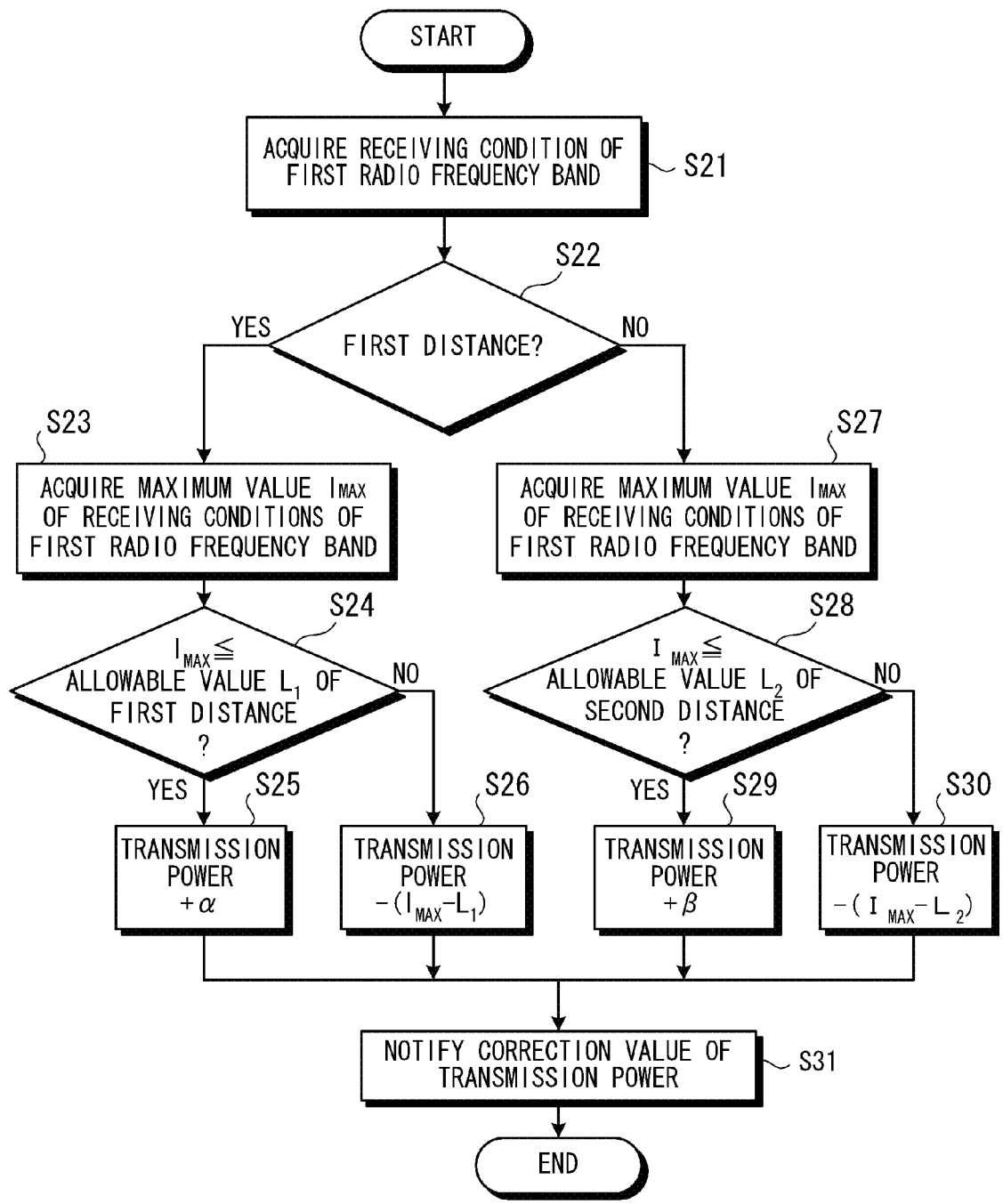
FIG. 7 illustrates a processing procedure when the controlling apparatus acquires receiving condition of the first radio frequency band.

Processing Procedure When Control Apparatus Acquires Receiving Condition of First Radio Frequency Band FIG. 7 is an explanatory diagram illustrating a processing procedure when the controlling apparatus of Embodiment 2 acquires the receiving condition of the first radio frequency band. As illustrated in FIG. 7, the controlling apparatus 7 first acquires the receiving condition of the first radio frequency band for each cell or sector from the base station 5 of each cell around the cell to which the mobile station 8 selected as the target for measurement belongs. For example, the controlling apparatus 7 acquires, from each base station 5, the reception power of the first radio frequency band as the information of the interference amount provided by the mobile station 8 selected as the target for measurement (step S21). Next, the controlling apparatus 7 determines whether or not the interval when the same radio frequency band is reused is a first distance in the mobile station 8 selected as the target for measurement (step S22). The intervals when the same radio frequency band is reused include the first distance and a second distance, where the first distance is smaller than the second distance.

When the interval in reusing the same radio frequency band is the first distance in the mobile station 8 selected as the target for measurement (step S22: Yes), the controlling apparatus 7 acquires the maximum value IMAX of the receiving conditions of the first radio frequency band acquired at step S21 from the cells or sectors adjacent to the cell or sector to which the mobile station 8 selected as the target for measurement belongs (step S23). Then, the controlling apparatus 7 determines whether or not the maximum value IMAX is equal to or lower than an allowable value L1 of the first distance (step S24).

When IMAX≤L1 (step S24: Yes), the controlling apparatus 7 sets +αdB as the correction value of the transmission power of the mobile station 8 selected as the target for measurement (step S25). When IMAX>L1 (step S24: No), the controlling apparatus 7 sets −(IMAX−L1)dB as the correction value of the transmission power of the mobile station 8 selected as the target for measurement (step S26).

On the other hand, when the interval in reusing the same radio frequency band is not the first distance in the mobile station 8 selected as the target for measurement, that is, when the interval is the second distance (step S22: No), the controlling apparatus 7 acquires the maximum value IMAX of the receiving conditions of the first radio frequency band acquired at step S21 from the associated sectors of the cells adjacent to the cell of the sector to which the mobile station 8 selected as the target for measurement belongs (step S27). Then, the controlling apparatus 7 determines whether or not the maximum value IMAX is equal to or lower than an allowable value L2 of the second distance (step S28).

When IMAX≤L2 (step S28: Yes), the controlling apparatus 7 sets +βdB as the correction value of the transmission power of the mobile station 8 selected as the target for measurement (step S29). When IMAX>L2 (step S28: No), the controlling apparatus 7 sets −(IMAX−L2)dB as the correction value of the transmission power of the mobile station 8 selected as the target for measurement (step S30). Then, the controlling apparatus 7 notifies the base station 5 of the cell to which the mobile station 8 selected as the target for measurement belongs of the correction value of the transmission power determined at step S25, step S26, step S29 or step S30 as the information of the calculated interference amount (step S31).

Figure 8:
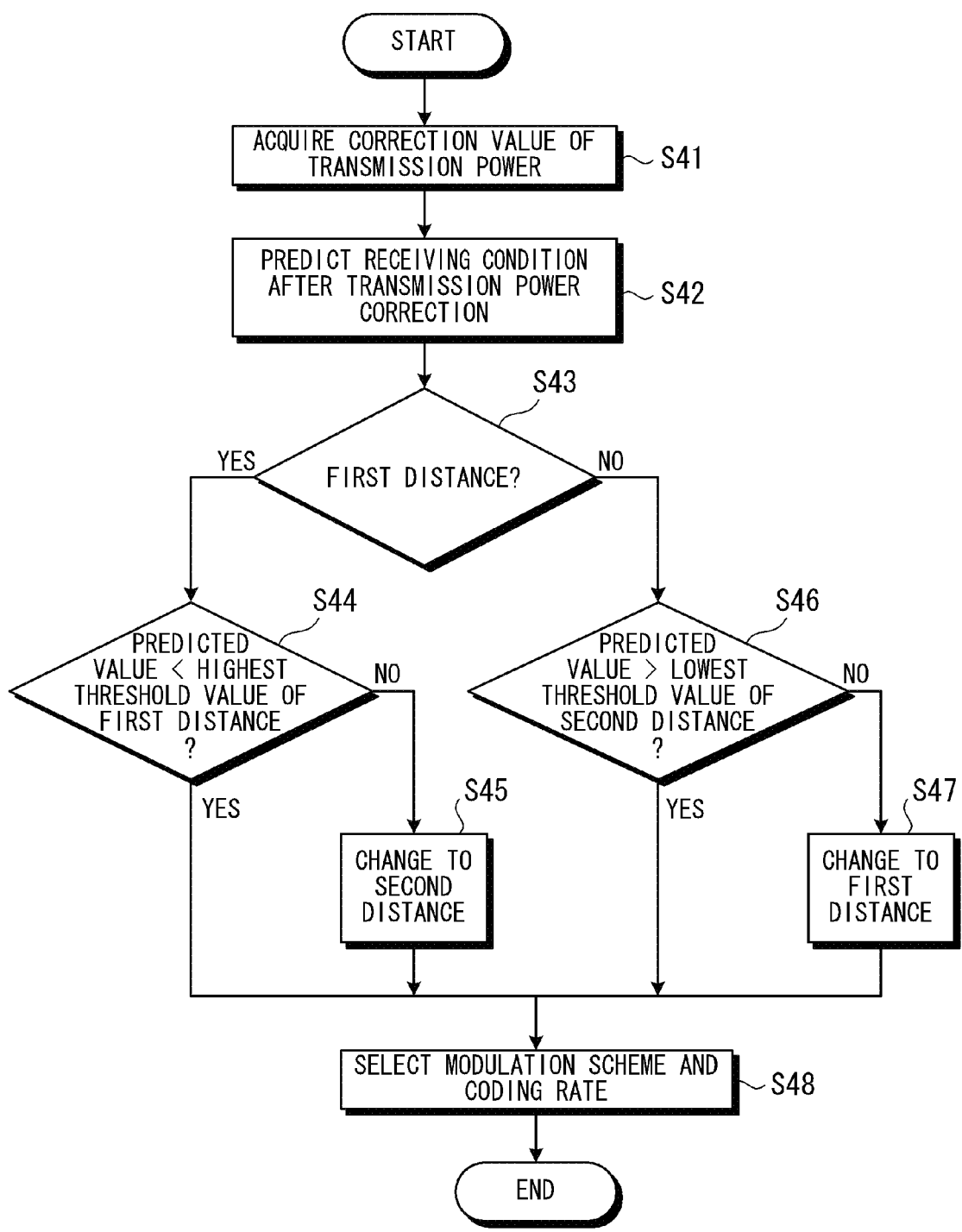
FIG. 8 illustrates a processing procedure when the base station acquires information of calculated interference amount.

Processing Procedure when Base Station Acquires Information of Calculated Interference Amount FIG. 8 is an explanatory diagram illustrating a processing procedure when the base station of Embodiment 2 acquires the information of the calculated interference amount. The base station which performs the processing is the base station of the cell to which the mobile station 8 selected as the target for measurement belongs. As illustrated in FIG. 8, the base station 5 first acquires the correction value of the transmission power of the mobile station 8 selected as the target for measurement as the information of the calculated interference amount from the controlling apparatus 7 (step S41). Next, the base station 5 predicts the receiving condition after the revising of the transmission power of the mobile station 8 selected as the target for measurement based on the correction value of the transmission power acquired at step S41. For example, the base station 5 refers to the CINR information of the mobile station 8 selected as the target for measurement stored in the profile list 51 and adds the correction value of the transmission power acquired at step S41 to the CINR value to provide a predicted value of CINR after the revising of the transmission power of the mobile station 8 selected as the target for measurement (step S42). Then, the base station 5 determines whether or not the interval when the same radio frequency band is reused is the first distance in the mobile station 8 selected as the target for measurement (step S43).

When the interval in reusing the same radio frequency band is the first distance in the mobile station 8 selected as the target for measurement (step S43: Yes), the base station 5 determines whether or not the predicted vale of CINR acquired at step S42 is smaller than the highest threshold value of the first distance (step S44). When the predicted value of CINR is smaller than the highest threshold value of the first distance (step S44: Yes), the base station 5 holds the first interval as the interval when the same radio frequency band is reused in the mobile station 8 selected as the target for measurement. When the predicted value of CINR is equal to or larger than the highest threshold value of the first distance (step S44: No), the base station 5 changes the interval when the same radio frequency band is reused in the mobile station 8 selected as the target for measurement to the second distance (step S45).

On the other hand, when the interval in reusing the same radio frequency band is not the first distance in the mobile station 8 selected as the target for measurement, that is, when the interval is the second distance (step S43: No), the base station 5 determines whether or not the predicted value of CINR acquired at step S42 is larger than the lowest threshold value of the second distance (step S46). When the predicted value of CINR is larger than the lowest threshold value of the second distance (step S46: Yes), the base station 5 holds the second interval as the interval when the same radio frequency band is reused in the mobile station 8 selected as the target for measurement. When the predicted value of CINR is equal to or smaller than the lowest threshold value of the second distance (step S46: No), the base station 5 changes the interval when the same radio frequency band is reused in the mobile station 8 selected as the target for measurement to the first distance (step S47). Then, the base station 5 refers to a MCS (Modulation and Coding Scheme) table in the scheduler 53 and selects the modulation scheme and the coding rate of the uplink signal based on the interval when the same radio frequency band is reused and the predicted of CINR of the mobile station 8 selected as the target for measurement (step S48).

Example of MCS Table

FIG. 9 is an explanatory diagram illustrating an example of the MCS table in Embodiment 2. In the example illustrated in FIG. 9, when CINR≤3 dB, the modulation scheme is QPSK (Quadrature Phase Shift Keying) and the coding rate is ½. When 3 dB<CINR≤6 dB, the modulation scheme is the QPSK and the coding rate is ¾. The present embodiment is not limited to the example illustrated in FIG. 9.

Control Example of Uplink of Mobile Station

FIG. 10 is an explanatory diagram illustrating an example of the profile list before revising in Embodiment 2. FIG. 11 is an explanatory diagram illustrating an example of the profile list after the revising in Embodiment 2. In FIGS. 10 and 11, CINR1 and CINR2 represent values of CINR when the intervals in reusing the same radio frequency band are the first distance and the second distance. For example, as illustrated in FIG. 10, CINR1 and CINR2 are 3 dB and 17 dB, respectively, and the interval in reusing the same radio frequency band is the second distance in a mobile station having ID #1. In this case, from the MCS table illustrated in FIG. 9, the modulation scheme and the coding rate are 64 QAM (Quadrature Amplitude Modulation) and ½, respectively. For example, as illustrated in FIG. 11, when the correction value of the transmission power is +3 dB, the predicted values of CINR1 and CINR2 are 6 dB and 20 dB, respectively. Assuming that the predicted value of CINR2 is larger than the lowest threshold value of the second distance, the interval in reusing the same radio frequency band after the revising is the second distance. From the MCS table illustrated in FIG. 9, the modulation scheme and the coding rate are 64 QAM and ¾.

In a mobile station having ID #2, for example as illustrated in FIG. 10, CINR1 and CINR2 are 5 dB and 18 dB, and the interval in reusing the same radio frequency band is the first distance. In this case, from the MCS table illustrated in FIG. 9, the modulation scheme and the coding rate are QPSK and ½, respectively. For example, as illustrated in FIG. 11, when the correction value of the transmission power is −3 dB, the predicted values of CINR1 and CINR2 are 2 dB and 15 dB, respectively. Assuming that the predicted value of CINR1 is equal to or larger than the highest threshold value of the first distance, the interval in reusing the same radio frequency band after the revising is the second distance. From the MCS table illustrated in FIG. 9, the modulation scheme and the coding rate are 16 QAM and ¾.

Embodiment 3

Embodiment 3 is an example in which a base station doubles as a controlling apparatus. The base station in this case corresponds to the third base station described in Embodiment 1.

Structure of Base Station

Figure 12:
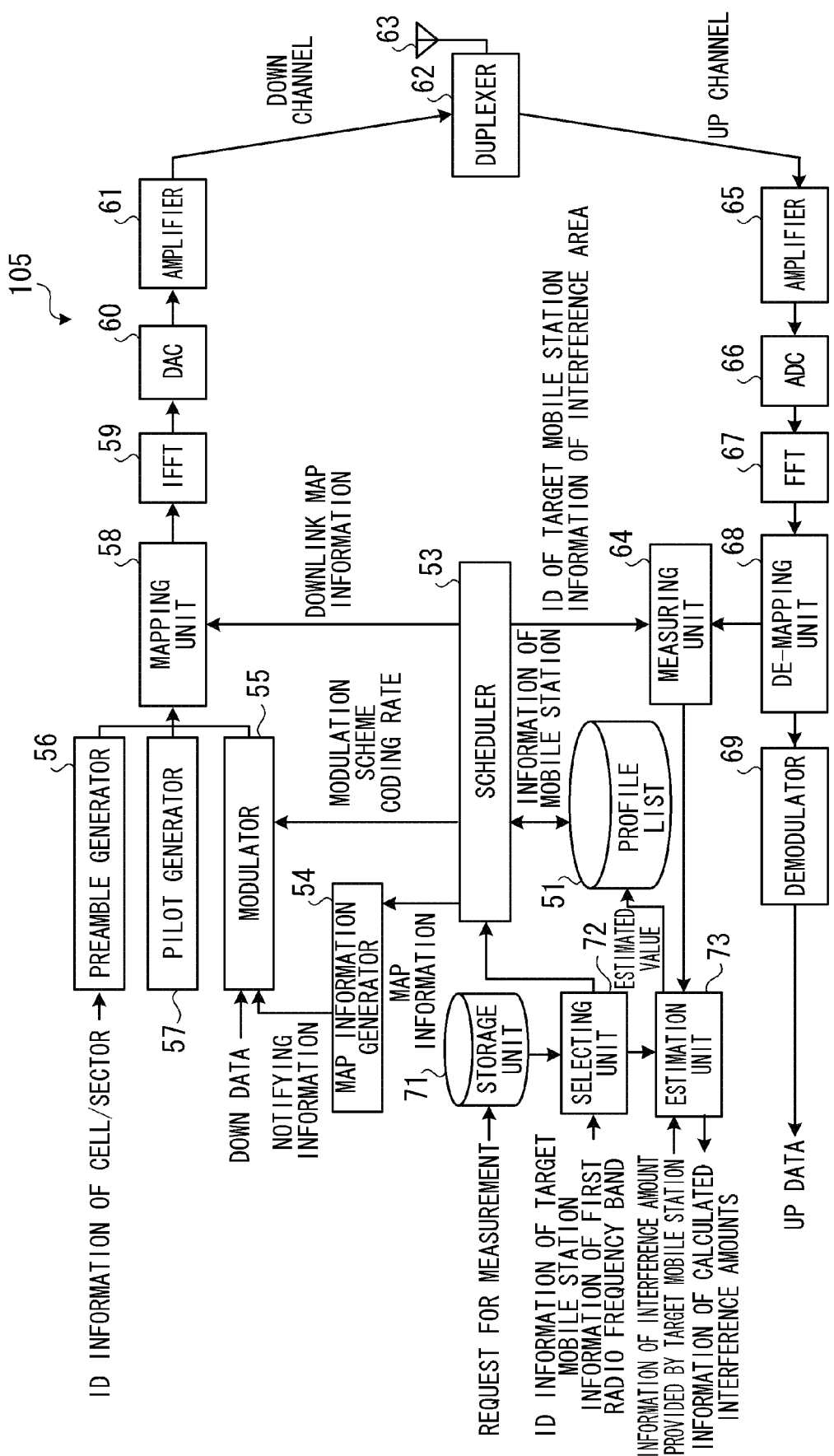
FIG. 12 illustrates an example of a base station.

FIG. 12 is an explanatory diagram illustrating the base station of Embodiment 3. As illustrated in FIG. 12, a base station 105 has the structure provided by adding the structure of the controlling apparatus 7 of Embodiment 2 illustrated in FIG. 4 (the storage unit 71, the selecting unit 72 and the estimation unit 73) to the structure of the base station 5 of Embodiment 2 illustrated in FIG. 3. The base station 105 of Embodiment 3 is not provided with a storage unit (the storage unit 52 in FIG. 3) which stores the ID information of the mobile station selected as the target for measurement and the information of the first radio frequency band. A scheduler 53 acquires ID information of a mobile station selected as a target for measurement and information of a first radio frequency band from a selecting unit 72. When the base station 105 corresponds to the first base station 2 or the second base station 3 of Embodiment 1, the processing procedure performed when the base station 105 receives a signal in the first radio frequency band and the processing procedure performed when the base station 105 acquires information of calculated interference amounts are as illustrated in FIG. 6 and FIG. 8, respectively. The processing procedure performed when the base station 105 acquires the receiving condition of the first radio frequency band from another base station is as illustrated in FIG. 7.

Embodiment 4

Embodiment 4 is an example in which a controlling apparatus acquires information reception quality in each mobile station from each base station and selects a mobile station as a target for measurement. In this state, the base station does not send a request for measurement to the controlling apparatus.

Structure of Controlling Apparatus

Figure 13:
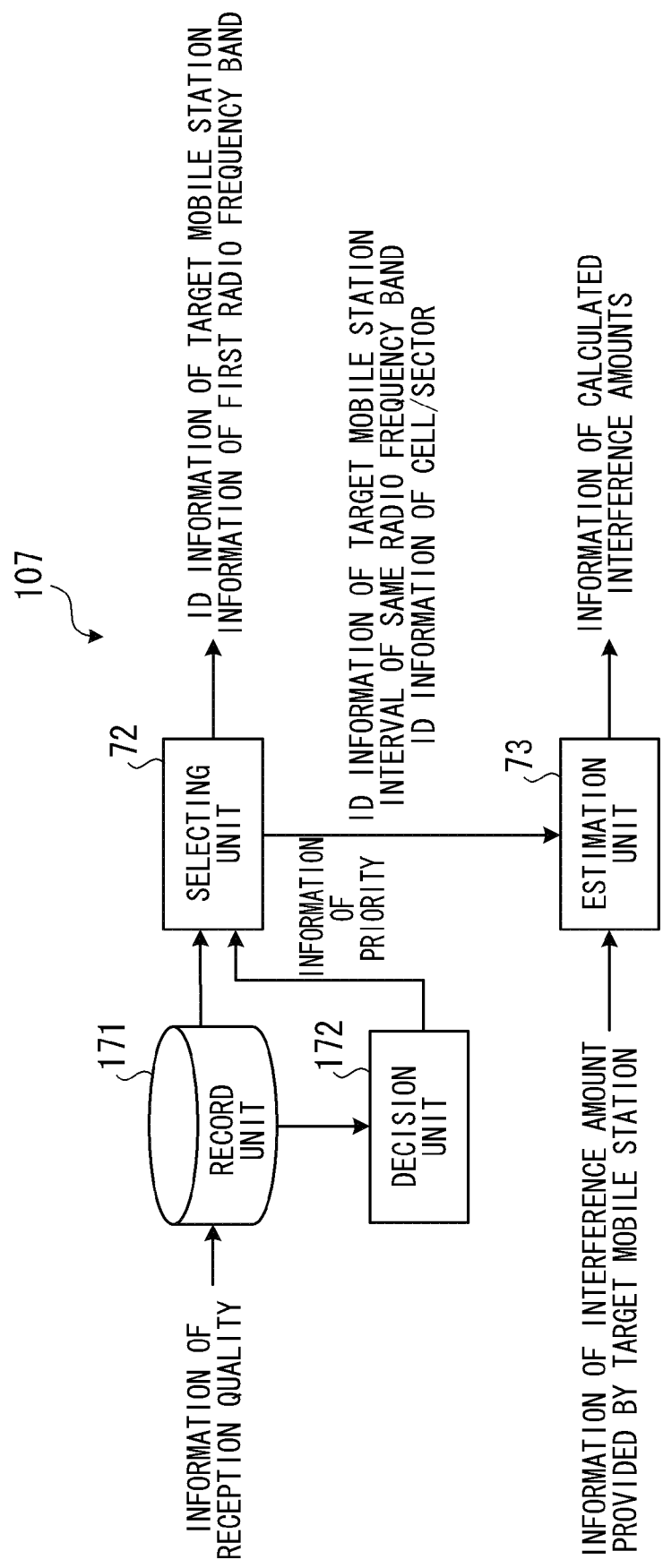
FIG. 13 illustrates an example of a controlling apparatus.

FIG. 13 is an explanatory diagram illustrating the controlling apparatus of Embodiment 4. As illustrated in FIG. 13, a controlling apparatus 107 has the structure provided by adding a record unit 171 and a decision unit 172 to the structure of the controlling apparatus 7 of Embodiment 2 illustrated in FIG. 4. The controlling apparatus 107 of Embodiment 4 is not provided with a storage unit (the storage unit 71 in FIG. 4) which stores the information included in the request for measurement. The controlling apparatus 107 acquires information of each mobile station from each base station. The record unit 171 records the information of each mobile station. Examples of the information of each mobile station include information of the transmission power, CINR value and position information. The decision unit 172 decides, for example, the priority of mobile stations from one located at the end of a cell or the end of a sector based on the information of the mobile station recorded in the record unit 171. The selecting unit 72 selects a mobile station as a target for measurement based on the priority notified by the decision unit 172 and notifies the information of the ID of the mobile station selected as the target for measurement and the information of the first radio frequency band to the base station of the cell to which the mobile station selected as the target for measurement belongs (the base station corresponding to the first base station 2 in Embodiment 1) and the base station of a cell on the periphery (the base station corresponding to the second base station 3 of Embodiment 1). The processing procedure performed when the controlling apparatus 107 acquires the receiving condition of the first radio frequency band from the base station is as illustrated in FIG. 7. The processing procedure performed when the base station receives a signal in the first radio frequency band and the processing procedure performed when the base station acquires the information of calculated interference amounts are as illustrated in FIG. 6 and FIG. 8, respectively.

According to the embodiments, the first radio frequency band is assigned to the mobile station selected as the target for measurement, and the second radio frequency band different from the first radio frequency band is assigned to the other mobile stations. Thus, when the base station other than the base station in the cell to which the mobile station selected as the target for measurement belongs receives a signal in the first radio frequency band, the base station can recognize the signal as an interference wave and notify the degree of the interference to the controlling apparatus or another base station which doubles as the controlling apparatus. The controlling apparatus or the other base station which doubles as the controlling apparatus can control the transmission power of the mobile station selected as the target for measurement based on the notification of the degree of the interference to achieve control of the inter-cell interference based on the degree of the interference of the actual uplink signal of the mobile station selected as the target for measurement. In addition, the scheduling of the uplink resources can be performed by determining the correction value of the transmission power of the mobile station selected as the target for measurement, predicting the reception quality based on the correction value, and controlling the modulation scheme and the coding rate of the uplink signal.

According to the embodiments described above, the inter-cell interference can be controlled. In addition, the scheduling of the uplink resources can be performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication apparatus comprising:
a receiver configured to receive an uplink signal in a first radio frequency band assigned for an uplink to the radio communication apparatus; and
a controller configured to:
control transmission power of a mobile terminal communicating with the radio communication apparatus in accordance with information about a receiving condition of a signal in the first radio frequency band, the receiving condition being detected by another radio communication apparatus transmitting and receiving a signal in a second radio frequency band different from the first radio frequency band, and
control, based on a receiving condition of an uplink signal of the mobile terminal after control of the transmission power, at least one of a modulation scheme, a coding rate and an interval when the same radio frequency band is reused.

2. The radio communication apparatus according to claim 1,
wherein the controller predicts the receiving condition of the uplink signal of the mobile terminal after control of the transmission power and, based on the prediction, decides at least one of the modulation scheme, the coding rate and the interval when the same radio frequency band is reused.

3. The radio communication apparatus according to claim 1, wherein
the controller is configured to control a downlink to the mobile terminal in accordance with the information about the receiving condition of the signal in the first radio frequency band.

4. The radio communication apparatus according to claim 3, wherein
the controller controls the downlink in accordance with information for controlling the transmission power from a controlling apparatus that provides the information for controlling the transmission power based on the information about the receiving condition notified from the another radio communication apparatus.

5. The radio communication apparatus according to claim 1,
wherein the controller is configured to predict a receiving condition of an uplink signal of the mobile terminal after control of the transmission power.

6. The radio communication apparatus according to claim 1, wherein
the controller controls the transmission power in accordance with information for controlling the transmission power from a controlling apparatus that provides the information for controlling the transmission power based on the information about the receiving condition notified from the another radio communication apparatus.

7. A controlling apparatus comprising:
a receiver configured to receive, from a second radio communication apparatus that transmits and receives a signal in a second radio frequency band different from a first radio frequency band assigned for an uplink to a first radio communication apparatus, information about a receiving condition of a signal in the first radio frequency band, the receiving condition being detected by the second radio communication apparatus; and a controller configured to:
control transmission power of a mobile terminal communicating with the first radio communication apparatus in accordance with the information about the receiving condition, and
control, based on a receiving condition of an uplink signal of the mobile terminal after control of the transmission power, at least one of a modulation scheme, a coding rate and an interval when the same radio frequency band is reused.

8. The controlling apparatus according to claim 7, further comprising:
a transmitter configured to transmit information for controlling the transmission power based on the information about the receiving condition of the signal in the first radio frequency band, to the first radio communication apparatus that controls the transmission power in accordance with the transmitted information.

9. The controlling apparatus according to claim 7, wherein the controller predicts the receiving condition of the uplink signal of the mobile terminal after control of the transmission power and, based on the prediction, decides at least one of the modulation scheme, the coding rate and the interval when the same radio frequency band is reused.

10. The controlling apparatus according to claim 7, wherein
the controlling apparatus is provided in a third radio communication apparatus.

11. A mobile communication system comprising:
a mobile terminal configured to transmit an uplink signal in a first radio frequency band;
a first radio communication apparatus configured to receive the uplink signal in the first radio frequency band;
a second radio communication apparatus configured to transmit and receive a signal in a second radio frequency band different from the first radio frequency band, and detect a receiving condition of a signal in the first radio frequency band, wherein
the first radio communication apparatus is configured to:
control transmission power of the mobile terminal in accordance with information about the receiving condition, and
control, based on a receiving condition of an uplink signal of the mobile terminal after control of the transmission power, at least one of a modulation scheme, a coding rate and an interval when the same radio frequency band is reused.

12. The mobile communication system according to claim 11, further comprising:
a controlling apparatus configured to provide information for controlling the transmission power based on the information about the receiving condition notified from the second radio communication, and wherein
the first radio communication apparatus controls the transmission power in accordance with the information provided by the controlling apparatus.

13. The mobile communication system according to claim 11, wherein
the first radio communication apparatus predicts the receiving condition of the uplink signal of the mobile terminal after control of the transmission power and, based on the prediction, decides at least one of the modulation scheme, the coding rate and the interval when the same radio frequency band is reused.

14. The mobile communication system according to claim 11, further comprising:
a controlling apparatus configured to control the transmission power based on the information about the receiving condition notified from the second radio communication apparatus and control, based on a receiving condition of an uplink signal of the mobile terminal after control of the transmission power, at least one of a modulation scheme, a coding rate and an interval when the same radio frequency band is reused.

15. The mobile communication system according to claim 14, wherein
the controlling apparatus predicts a receiving condition of the uplink signal of the mobile terminal after control of the transmission power and, based on the prediction, decides at least one of the modulation scheme, the coding rate and the interval when the same radio frequency band is reused.

16. The mobile communication system according to claim 14, wherein
the controlling apparatus is provided in a third radio communication apparatus.

17. The mobile communication system according to claim 11, wherein
the first radio communication apparatus is configured to control a downlink to the mobile terminal in accordance with the information about the receiving condition of the signal in the first radio frequency band.

18. The mobile communication system according to claim 17, further comprising:
a controlling apparatus configured to provide information for controlling the transmission power based on the information about the receiving condition notified from the second radio communication apparatus, and wherein
the first radio communication apparatus controls the downlink in accordance with the information provided by the controlling apparatus.

19. A radio communication method comprising:
assigning a first radio frequency band to a mobile terminal;
transmitting an uplink signal in the first radio frequency band from the mobile terminal to a first radio communication apparatus;
detecting a receiving condition of a signal in the first radio frequency band by a second radio communication apparatus transmitting and receiving a signal in a second radio frequency band different from the first radio frequency band;
controlling transmission power of the mobile terminal in accordance with information about the receiving condition, and, based on a receiving condition of an uplink signal of the mobile terminal after control of the transmission power, at least one of a modulation scheme, a coding rate and an interval when the same radio frequency band is reused.

20. The radio communication method according to claim 19, wherein
the controlling includes predicting the receiving condition of the uplink signal of the mobile terminal after control of the transmission power and, based on the prediction, deciding at least one of the modulation scheme, the coding rate and the interval when the same radio frequency band is reused.

21. The radio communication method according to claim 19, further comprising:
- controlling a downlink to the mobile terminal of the first radio communication apparatus in accordance with the information about the receiving condition of the signal in the first radio frequency band.

22. A mobile terminal comprising:
- a transmitter configured to transmit an uplink signal in a first radio frequency band to a first radio communication apparatus; and
- a controller configured to:
  - control transmission power in accordance with controlling the transmission power by the first radio communication apparatus in accordance with information about a receiving condition of a signal in the first radio frequency band, the receiving condition being detected by another radio communication apparatus transmitting and receiving a signal in a second radio frequency band different from the first radio frequency band, and
  - perform communication with the first radio communication apparatus in accordance with at least one of a modulation scheme, a coding rate and an interval when the same radio frequency band is reused, controlled by the first radio communication apparatus based on a receiving condition of an uplink signal of the mobile terminal after control of the transmission power.

\* \* \* \* \*